United States Patent Office 3,755,581
Patented Aug. 28, 1973

3,755,581
COMBATTING PHYTOPATHOGENIC BACTERIA
AND FUNGI WITH N-PHENYLQUINAZOLONES
Stefan Janiak, Basel, Switzerland, assignor to
Ciba-Geigy AG, Basel, Switzerland
No Drawing. Original application Feb. 24, 1969, Ser. No.
801,830, now abandoned. Divided and this application
Nov. 12, 1970, Ser. No. 89,018
Claims priority, application Switzerland, Feb. 27, 1968,
2,779/68
Int. Cl. A01n 9/00
U.S. Cl. 424—251
9 Claims

ABSTRACT OF THE DISCLOSURE

Phytopathogenic bacteria and fungi are controlled with quinazolones of the formula

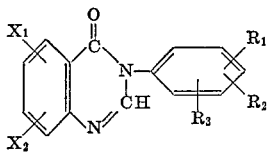

in which each of $X_1$ and $X_2$ is hydrogen, halogen, lower alkyl, lower alkoxy or lower alkylthio; and each of $R_1$, $R_2$ and $R_3$ is hydrogen, halogen, $CF_3$, CN, $NO_2$, lower alkyl, lower alkoxy, carboxy lower alkyl, lower acylamino, phenoxy or halogenated phenoxy.

---

This is a division of application Ser. No. 801,830, filed Feb. 24, 1969, now abandoned.

This invention provides pesticidal preparations which contain as active component a compound of the general formula

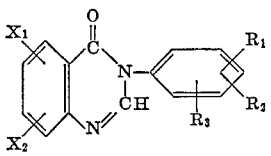

(I)

in which $X_1$ and $X_2$ may be identical or different and each represents a hydrogen or a halogen atom or a low alkyl, low alkoxy or low alkylthio group, and $R_1$, $R_2$ and $R_3$ each represents a hydrogen or a halogen atom or a $CF_3$, —$NO_2$, —CN, low alkyl, low alkoxy, low carbalkoxy or low acylamino group or an unsubstituted or halogenated phenoxy radical. The preparations may contain one or more of the following additives: a solvent, a diluent, an emulsifying agent, a wetting agent, a dispersing agent, an adhesive, a thickening agent or a binder and, if necessary, a known pesticide.

In Formula I $X_1$ and $X_2$ each represents a hydrogen or a halogen atom or a low alkyl, low alkoxy or low alkylthio radical, and therefore $X_1$ and $X_2$ may be identical or different. The term "halogen" as used herein refers to fluorine, bromine and iodine and, in particular, chlorine. The low alkyl, alkoxy and alkylthio radicals contain 1 to 4, but preferably 1 to 2, carbon atoms. However, specially effective compounds may be obtained when $X_1$ and $X_2$ each represents a hydrogen atom.

The symbols $R_1$, $R_2$ and $R_3$ each represent a hydrogen or a halogen atom or an $F_3C$, $O_2N$, NC, low alkyl, low carbalkoxy, low acylamino or a halogenated or unsubstituted phenoxy group. $R_1$, $R_2$ and $R_3$ can therefore be identical or different and, depending on the meanings of the symbols $R_1$, $R_2$ and $R_3$, the phenyl nucleus concerned can thus be unsubstituted or contain up to three, but preferably two, substituents. The position of these substituents in the phenyl nucleus is optional. Specially preferred, however, are the 2,3-, 2,5- and 2,6-positions. In this case, $R_1$, $R_2$ and $R_3$ can, inter alia, each represent a halogen atom, a low alkyl, alkoxy, carbalkoxy, acylamino or a halogenated or unsubstituted phenoxy group. In this case the term "halogen" refers to fluorine and bromine, preferably chlorine and bromine. The low alkyl and alkoxy groups contain 1 to 4, but preferably 1 to 2, carbon atoms. The carbalkoxy groups likewise contain 1 to 4, but preferably 1 to 2, carbon atoms in the alkoxy group. In the case of the low acylamino groups, the acid portion is derived from a low-molecular-weight unsaturated, but preferably saturated, aliphatic acid containing a carbon chain comprising 1 to 4, but preferably 1 to 2, carbon atoms. The halogenated phenoxy radicals can contain 1 to 5, but preferably 1 to 2, halogen atoms. Suitable halogen atoms are fluorine, bromine and iodine, and especially chlorine atoms.

Compounds in accordance with the invention which are specially suitable will therefore correspond to the formula

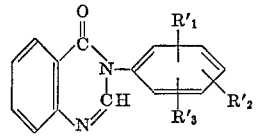

(II)

in which $R'_1$, $R'_2$ and $R'_3$ each represents a hydrogen or a chlorine or a bromine atom, or an $F_3C$ or a low alkyl group. The alkyl group contains 1 to 4, especially 1 to 2, carbon atoms.

Compounds of Formula II which are specially important are those corresponding to the formulae

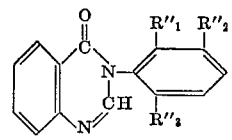

(IIIa)

and

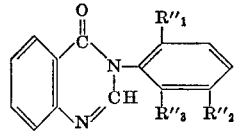

(IIIb)

in which $R''_1$ represents a chlorine atom or a methyl group and $R''_2$ and $R''_3$ each represents a hydrogen or a chlorine atom or a methyl group.

Compounds that are of special interest are those of the formulae

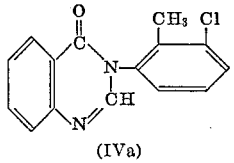

(IVa)

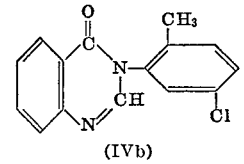

(IVb)

or

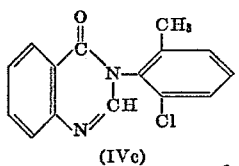 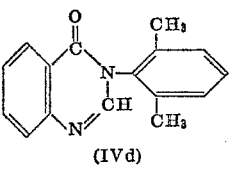

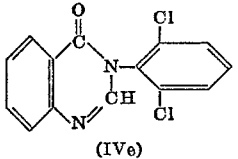

The active principles corresponding to the Formulae I to IVe are new quinazolones, more specifically 3-phenyl-4-quinazolones.

The invention therefore also relates to the compounds themselves.

The active principles of the Formula I are manufactured by reacting an isatoic anhydride which may be substituted in the phenyl nucleus with an aniline and a low-molecular-weight ortho-formic acid alkylester. The reaction is preferably carried out with the application of heat. It may be carried out in the presence or absence of a solvent. The ortho-formic acid alkylester used in the reaction can also serve as the solvent.

The compounds of Formula I have a pronounced biocidal action and are specially suitable for use against phytopathogenic bacteria and fungi, especially powdery mildew. An outstanding feature is their excellent systemic action. They are also effective against insects, members of the order Acarina, for example, ticks and spider mites, and gastropods. A number of Formula I compounds also have a tranquilizing action on cattle and other farm stock. Compounds of this kind can be used for stock to be fattened.

The new active principles of the invention can be used alone or in conjunction with other compounds having a biocidal action, especially fungicides. Examples of fungicides are as follows: thiocarbamates, for example, maneb, zineb, ferbam, ziram; thiurams, for example, TMTD, DPTD, metiram; chloronitrobenzenes, captan, dithianone, dodine, Karathane, Wepsyn and so forth.

The new preparations can be used in many different ways; for example, they may be used in the form of spraying solutions, dusting powders, in the form of grains and so forth. For example, a solution or dispersion of one of the active principles can be poured on to the roots of the plants to be treated, or grains saturated with one of the active principles can be worked into the soil.

Aqueous sprays can be prepared, for example, from an emulsifiable concentrate or a wettable powder. A suitable emulsifiable concentrate can be prepared, for example, from approximately 25 parts of a compound of Formula I, 40 to 50 parts of diacetone alcohol or isophorone, 20 to 30 parts of an aromatic petroleum product, xylene, toluene or another mixture of such solvents, and 2 to 10 parts of one or more emulsifying agents. A small amount of an agent that assists the formation of a homogeneous solution can also be used, for example, methanol, methoxymethanol or butoxymethanol.

A suitable emulsifying agent can be prepared, for example, from 1 to 1.5 parts of calcium or sodium dodecylbenzene-sulphonate, 2.5 to 4 parts of an octyl- or nonyl-phenoxy-polyethoxyethanol and approximately 0.5 to 1 part of methanol and 0 to 0.8 part of xylene. The resulting mixture is added to the solvents and the active compound of the Formula I in the above-mentioned quantitative ratio. It is also possible to use another or several other surface-active agents. Any such agent, for example, an anionic, cationic or non-ionic solvent-soluble emulsifying agent can be used, according to preference or suitability. The above-mentioned non-ionic agent derived from an alkylphenol and ethylene oxide can be replaced, for example, by ethylene oxide condensates of long-chain alcohols, carboxylic acids, phenols or amines. All these kinds of compound are available commercially. Non-ionic condensates of polyalcohols and fatty acids or polyalcohols, fatty acids and a resin-forming acid, for example, phthalic acid or abietic acid, can also be used in the production of self-emulsifying preparations. Typical anionic agents are those based on alcohol sulphonates, alcohol sulphates or alcohol sulphosuccinates. Examples of solvent-soluble cationic surface-active agents are oleyl-benzyldimethylammonium chloride or dodecyl-benzyl-trimethylammonium chloride or bromide. It is thus evident that the character of an emulsifying agent is not critical, provided it is soluble in a solution of the active principle in one or more inert organic solvents.

A wettable powder can be prepared by dissolving an active principle of Formula I in a volatile solvent, for example, acetone, combining the solution with a finely powdered solid, for example, kaolin, pyrophyllite or diatomaceous earth, and evaporating the solvent. The powder is heated with a small amount of one or more wetting and dispersing agents. A typical composition consists, for example, of 20 parts of one of the active principles of Formula I, 77.5 parts of one or more finely powdered solids, 0.5 part of a wetting agent, for example, octylphenoxypolyethoxyethanol, and 2 parts of the sodium salt of methylene-bis-naphthalenesulphonic acid.

Dusting preparations having an active-principle content of 5 to 10 percent can be made by extending a wettable powder of the kind mentioned with a finely powdered solid support material. The wetting agent can be omitted if desired, likewise the dispersing agent, or the dispersing agent can be replaced by another.

All of the fungicidal preparations described above generally contain a carrier and, in most cases, a surface-active agent.

The amount of active principle present in the new pesticidal preparations can vary within wide limits; it is generally within the range of from 0.01 to 10 percent by weight in dilute preparations and within the range of from 10 to 90 percent by weight in concentrated preparations.

EXAMPLE 1

64.8 grams of 2,6-dichloroaniline, 56 grams of ortho-formic acid triethylester and 65.5 grams of isatoic anhydride are introduced into a round-bottomed flask prepared for distillation. The batch is heated overnight at a bath temperature of 160° C., during which period the alcohol formed distils together with a trace of ortho-formic acid ester. After cooling, 500 ml. of isopropanol and 5 grams of active carbon are added and the whole is heated for 10 minutes at the boil. After cooling, crystals having a slight brownish tinge precipitate rapidly. In this manner the active principle of the formula

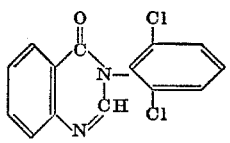

melting at 150 to 153° C. is obtained. The yield amounts to 99 grams, that is to say, 86 percent of the theoretical yield. [Active principle No. 1.]

The active principles corresponding to the formula

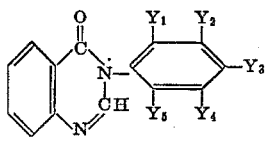

may be obtained in a manner analogous to that described above:

| Cpd. No. | Y₁ | Y₂ | Y₃ | Y₄ | Y₅ | Melting point in, °C. |
|---|---|---|---|---|---|---|
| 2 | H | H | H | H | H | 134–134.5 |
| 3 | H | H | H | Cl | H | 159–160 |
| 4 | H | H | H | Br | H | 150–151 |
| 5 | H | H | H | CF₃ | H | 134–135 |
| 6 | H | H | H | Cl | CH₃ | 117–120 |
| 7 | H | H | H | CH₃ | CH₃ | 150–152 |
| 8 | H | H | Cl | H | H | 177–178 |
| 9 | H | H | Br | H | H | 178–179 |
| 10 | H | H | CH₃ | H | H | 148–149 |
| 11 | H | H | COOC₂H₅ | H | H | 184–186 |
| 12 | H | H | NHCOCH₃ | H | H | 215–216 |
| 13 | H | H | OC₆H₄Cl(p) | H | H | 199–200 |
| 14 | H | H | OC₆H₄Cl(o) | H | H | 112–114 |
| 15 | H | H | Cl | H | Cl | 169–170 |
| 16 | H | H | Cl | H | CH₃ | 110–113 |
| 17 | H | H | Cl | H | OCH₃ | 135–139 |
| 18 | H | H | CF₃ | H | Cl | 174 |
| 19 | H | H | NO₂ | H | CN | 169–173 |
| 20 | H | H | CH₃ | H | CH₃ | Oil |
| 21 | H | H | OCH₃ | H | Cl | 185–186 |
| 22 | H | H | Cl | Cl | H | 198–201 |
| 23 | H | H | Cl | CF₃ | H | 156–157 |
| 24 | H | H | CH₃ | Cl | H | 198–199 |
| 25 | H | H | CH₃ | CH₃ | H | 128–131 |
| 26 | H | Cl | H | H | CH₃ | 132–135 |
| 27 | H | CH₃ | H | H | CH₃ | 87–88 |
| 28 | H | Cl | Cl | H | Cl | 205–208 |
| 29 | H | CH₃ | Cl | H | OCH₃ | 147–152 |
| 30 | Cl | H | H | H | CH₃ | 119–122 |
| 31 | CH₃ | H | H | H | CH₃ | 90–92 |
| 32 | C₂H₅ | H | H | H | C₂H₅ | Oil |

The compounds corresponding to the following formula can also be prepared in the manner described above:

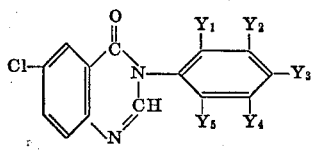

| Compound No. | Y₁ | Y₂ | Y₃ | Y₄ | Y₅ | Melting point in, °C. |
|---|---|---|---|---|---|---|
| 33 | H | H | H | CF₃ | H | 105–107 |
| 34 | H | H | H | CH₃ | CH₃ | 124–128 |
| 35 | H | H | Cl | CF₃ | H | 195–198 |
| 36 | H | CF₃ | H | H | Cl | 136–140 |
| 37 | H | CF₃ | H | CF₃ | H | 239–242 |
| 38 | Cl | H | H | H | Cl | 84–87 |
| 39 | Cl | H | H | H | CH₃ | 172–173 |
| 40 | CH₃ | H | H | H | CH₃ | 173–175 |

EXAMPLE 2

(a) Dusting preparations

Equal parts of one of the active principles of the invention and precipitated silica are finely ground. Dusting preparations preferably having a 1–6% active principle content can be prepared therefrom by admixture with kaolin or talcum.

(b) Wettable powders

A powder that can be used in the preparation of a spraying liquor can be made, for example, by mixing and finely grinding the following components:

50 parts of an active principle in accordance with the invention
5 parts of "Hi-sil" (highly adsorptive silica)
40 parts of bolus alba (kaolin)
3.5 parts of a reaction product derived from para-tert.-octylphenol and ethylene oxide
1.5 parts of the sodium salt of 1-benzyl-2-stearylbenzimidazole-6,3'-disulphonic acid.

(c) Emulsion concentrate

Emulsion concentrates can be prepared in the following manner from active principles having good solubility:

20 parts of active principle
70 parts of xylene
10 parts of a mixture comprising a reaction product derived from an alkylphenol and ethylene oxide and calcium dodecylbenzenesulphonate are mixed. An emulsion ready for spraying can be prepared therefrom by diluting the mixture with water to the desired concentration.

EXAMPLE 3

The compounds listed below are highly effective against powdery mildew.

Pumpkin plants (*Cucurbita pepo* L.) were grown in a greenhouse and treated once prophylactically with aqueous liquors containing 0.1% of active principle, the liquors being applied by spraying or pouring. Two days after the treatment the plants were infected with spores of *Erysiphe cichoriacearum* D.C. and then checked for fungus attack after 12 to 14 days.

The following results were obtained:
Action against *E. cichoriacearum* in percent:

| Active principle No. | Residual application | Root application |
|---|---|---|
| 1 | 95 | 100 |
| 26 | 95 | 95 |
| 7 | 95 | 95 |
| 31 | 30 | 100 |
| Untreated control | 0 | 0 |

EXAMPLE 4

Three-year-old apple trees (Jonathans) were treated eleven times during the vegetation period at approximately ten-day intervals, starting in mid-April, with aqueous dispersions of active principle No. 25 in different concentrations; the dispersions were applied by spraying. Three trees were treated with each preparation. The spray was prepared by dispersing 0.1% of active principle in water. 1 litre of spray was used per tree.

By mid-June, attack by *Podosphaere laucotricha* (Ell. et Ev.) Salm. was observed; as far as possible, 25 shoots per tree and 4 leaves per shoot were checked. The following table shows the results obtained compared with two standard preparations:

| Compound | Concentration of active principle, percent | Average number of leaves attacked per tree |
|---|---|---|
| Compound 25 | 0.1 | 3 |
| Moricide | 0.05 | 3 |
| Morestan | 0.009 | 10 |
| Control | | 44 |

I claim:
1. A method for combatting phytopathogenic bacteria and fungi which comprises applying thereto a bactericidally and fungicidally effective amount of a compound of the formula

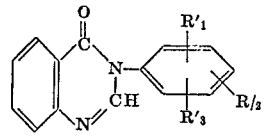

wherein each of R'₁, R'₂ and R'₃ is hydrogen, chlorine, bromine, CF₃ or alkyl of from 1 to 4 carbons.

2. The method of claim 1 in which the compound is of the formula:

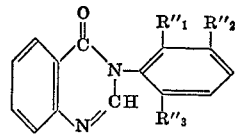

or

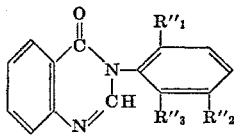

wherein R″₁ is chlorine or methyl; and each of R″₂ and R″₃ is hydrogen, chlorine or methyl.

3. The method of claim 2 in which the compound is

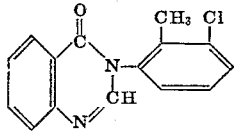

4. The method of claim 2 in which the compound is

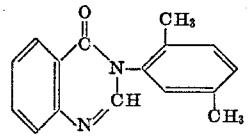

5. The method of claim 1 in which the compound is

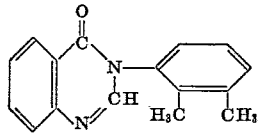

6. The method of claim 2 in which the compound is

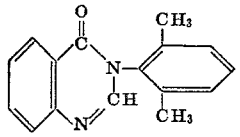

7. The method of claim 1 in which the compound is

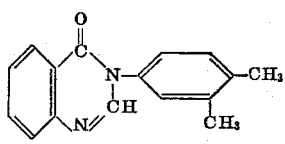

8. The method of claim 2 in which the compound is

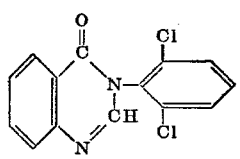

9. The method of claim 2 in which the compound is

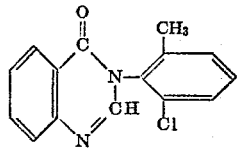

References Cited
UNITED STATES PATENTS

| | | | |
|---|---|---|---|
| 3,162,634 | 12/1964 | Klosa | 424—251 |
| 3,135,659 | 6/1964 | Shetty et al. | 424—251 |
| 3,542,779 | 11/1970 | Ecsery et al. | 424—251 |

FOREIGN PATENTS

| | | | |
|---|---|---|---|
| 915,264 | 1/1963 | Great Britain | 424—251 |

ALBERT T. MEYERS, Primary Examiner

F. E. WADDELL, Assistant Examiner